United States Patent
Sirot et al.

(10) Patent No.: US 9,715,509 B2
(45) Date of Patent: Jul. 25, 2017

(54) METHOD FOR NAVIGATING IDENTIFIERS PLACED IN AREAS AND RECEIVER IMPLEMENTING THE METHOD

(75) Inventors: Joel Sirot, Montreuil sur Ille (FR);
Louis Chevallier, La Meziere (FR);
Jean-Ronan Vigouroux, Rennes (FR)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 49 days.

(21) Appl. No.: 13/521,250

(22) PCT Filed: Jan. 11, 2011

(86) PCT No.: PCT/EP2011/050285
§ 371 (c)(1),
(2), (4) Date: Jul. 10, 2012

(87) PCT Pub. No.: WO2011/083178
PCT Pub. Date: Jul. 14, 2011

(65) Prior Publication Data
US 2012/0290980 A1    Nov. 15, 2012

(30) Foreign Application Priority Data
Jan. 11, 2010   (FR) ......................................... 10 5151

(51) Int. Cl.
*G06F 3/048*     (2013.01)
*G06F 17/30*     (2006.01)
*G06F 3/0482*    (2013.01)

(52) U.S. Cl.
CPC ...... *G06F 17/30274* (2013.01); *G06F 3/0482* (2013.01); *G06F 17/30572* (2013.01)

(58) Field of Classification Search
CPC .......................... H04N 5/44543; G06F 9/4443
(Continued)

(56) References Cited

U.S. PATENT DOCUMENTS 5,787,420 A *  7/1998  Tukey et al.
5,983,239 A    11/1999  Cannon
(Continued)

FOREIGN PATENT DOCUMENTS

| EP | 1669897 | 6/2006 |
|----|---------|--------|
| FR | 2822261 | 9/2002 |
| JP | 2004246852 | 9/2004 |

OTHER PUBLICATIONS

Scheirer, "Music-Listening Systems", Massachusetts Institute of Technology, Jun. 2000. (248 pages).
(Continued)

*Primary Examiner* — Joy Weber
(74) *Attorney, Agent, or Firm* — Tutunjian & Bitetto, P.C.

(57) ABSTRACT

The present invention relates to a method for navigating over documents represented by identifiers displayed on a navigation menu. Each document is associated with a plurality of numerical values characterizing it according to a plurality of criteria. Each identifier of a document is placed at a position dependent on a part of the parameter values associated with this document. The whole set of the documents is subdivided into a given number of regions. The sums of the values associated with all the documents of a region and corresponding to a certain number of criteria are virtually equal for each region. The outer contour of the regions is displayed so as to enable its selection. The selection of a region triggers the display in full screen mode of all of the identifiers of the selected region. The invention also relates to a display device capable of executing the navigation method.

16 Claims, 6 Drawing Sheets

Figure 1:
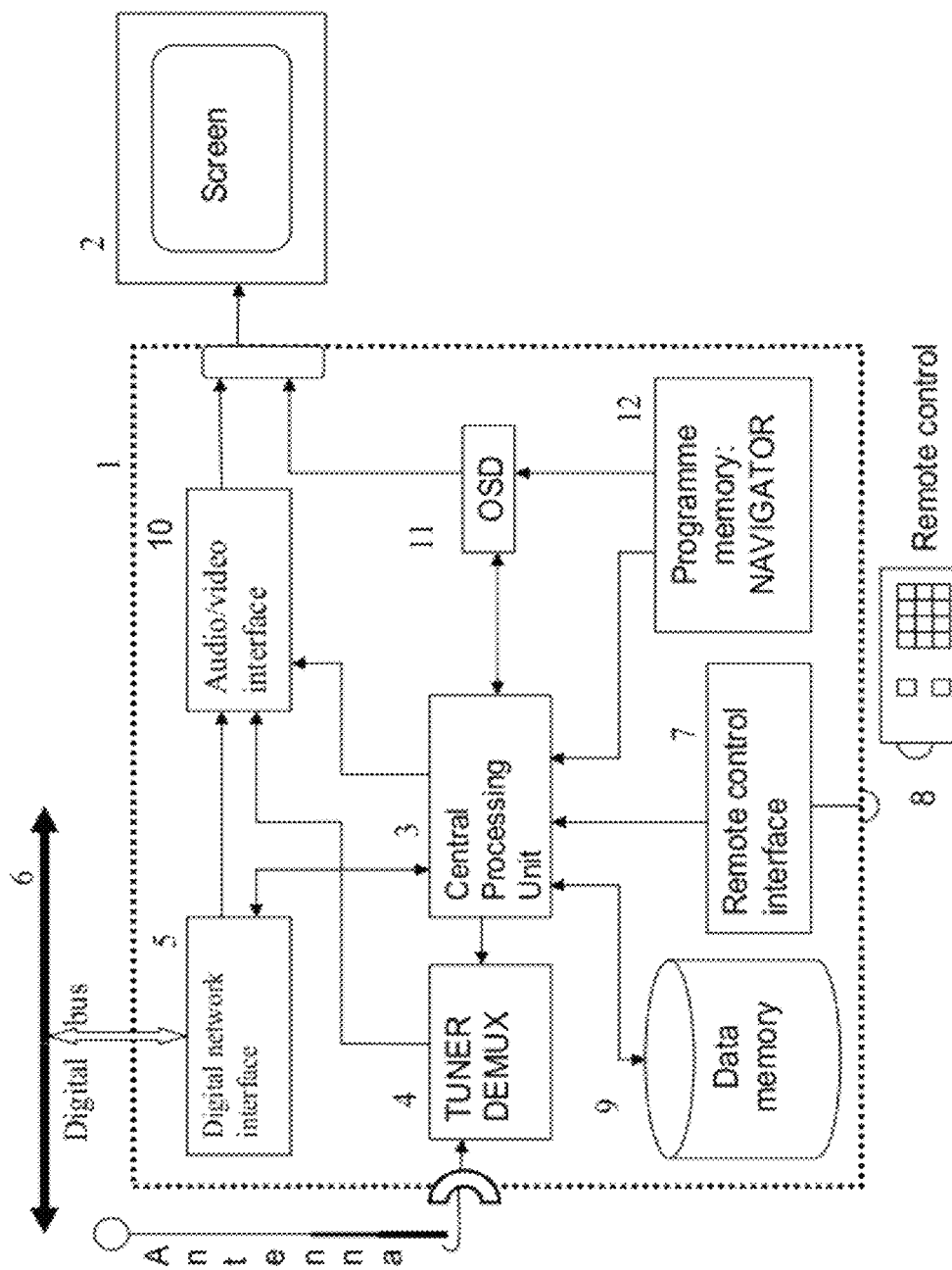

(58) Field of Classification Search
USPC .................................................. 715/810, 781
See application file for complete search history.

(56) References Cited

U.S. PATENT DOCUMENTS

| | | | |
|---|---|---|---|
| 6,728,752 B1* | 4/2004 | Chen et al. .................... | 709/203 |
| 8,583,615 B2* | 11/2013 | White et al. .................. | 707/705 |
| 2001/0030667 A1 | 10/2001 | Kelts | |
| 2001/0049826 A1* | 12/2001 | Wilf .............................. | 725/120 |
| 2004/0111404 A1 | 6/2004 | Mano et al. | |
| 2004/0139064 A1 | 7/2004 | Chevallier et al. | |
| 2006/0149768 A1 | 7/2006 | McCormack et al. | |
| 2006/0149769 A1 | 7/2006 | McCormack et al. | |
| 2008/0065622 A1* | 3/2008 | Goto et al. ........................ | 707/5 |
| 2008/0147660 A1 | 6/2008 | Jarczyk | |
| 2008/0163056 A1* | 7/2008 | Lamadon ....................... | 715/716 |
| 2009/0024596 A1 | 1/2009 | Basso et al. | |
| 2009/0152349 A1 | 6/2009 | Bonev et al. | |
| 2009/0158196 A1* | 6/2009 | Crystal .......................... | 715/780 |
| 2010/0104217 A1* | 4/2010 | Tsurumi ........................ | 382/284 |
| 2010/0153885 A1* | 6/2010 | Yates ............................. | 715/841 |

OTHER PUBLICATIONS

Makhoul et al. "Speech and Language Technologies for Audio Indexing and Retrieval", IEEE, vol. 88 No. 8, Aug. 2000. (16 pages).
Feiten et al. "Automatic Indexing of a Sound Database Using Self-organizing Neural Nets", Computer Music Journal, vol. 18, No. 3, pp. 53-65, Fall 1994.
Bennett, J. et al., "The Netflix Prize", Proceedings of KDD Cup and Workshop, Aug. 2007. (4 pages).
Breese, J. et al., "Empirical Analysis of Predictive Algorithms for Collaborative Filtering", UAI'98 Proceedings of the Fourteenth conference on Uncertainty in artificial intelligence, Oct. 1998. (21 pages).
Candillier, L. et al., "Comparing State-of-the-Art Collaborative Filtering Systems", Machine Learning and Data Mining in Pattern Recognition, Lecture Notes in Computer Science, vol. 4571, 2007, pp. 548-562.
Ma, C. "Large Scale Collaborative Filtering Algorithms", Department of Computer Science, National Taiwan University, 2008, pp. 1-27.
Dhillon, I. et al, "Generalized Nonnegative Matrix Approximations with Bregman Divergences" Advances in Neural Information Processing Systems 18, NIPS 2005, Dec. 2005. (8 pages).
Karypis, G., "Evaluation of Item-Based Top-N Recommendation Algorithms", 10th Conference of Information and Knowledge Management (CIKM), pp. 247-254, 2001.
Jaccard, P., "Etude comparative de la distribution florale dans une portion des Alpes et du Jura", Bulletin del la Société Vaudoise des Sciences Naturelles, vol. 37 (1901), pp. 547-579.
Lee, D. et al., "Learning the parts of objects by non-negative matrix factorization", Nature, vol. 401, Oct. 1999. (4 pages).
Lemire, D. et al., "Slope One Predictors for Online Rating-Based Collaborative Filtering", SIAM Data Mining (SDM '05), Apr. 2005. (5 pages).
Paatero, P., "Least squares formulation of robust non-negative factor analysis" Chemometrics and Intelligent Laboratory Systems 37, 1997, pp. 23-25.
Pessoit, J. et al., "Factoisation en matrices non negatives pour le filterage collaboratif", CORIA 2006, Mar. 2006, pp. 315-226.
Ratwani, R. et al., "Predicting Postcompletion Errors using Eye Movements", CHI Apr. 2007. (4 pages).
Resnick, P. et al,. "GroupLens: An Open Architecture for Collabarative Filtering Netnews", Proceedings of ACM 1994, pp. 175-186.
Castagnos, S., "Modélisation de comportements et apprentissage stochastique non supervisé de stratégies d'interactions sociales au sein de systèmes temps réel de recherche et d'accès à l'information", Modeling and Simulation, Universite Nancy II, 2008. (171 pages).
Sarwar, B. et al., "Item-Based Collaborative Filtering Recommendation Algorithms", WWW10, May 2001. (11 pages).
Shardanand, U. et al., "Social Information Filtering: Algorithms for Automating "Word of Mouth"", CHI '95 Proceedings of the SIGCHI Conference on Human Factors in Computing Systems, 1995. pp. 210-217.
Soresensen, T., "A Method of Establishing Groups of Equal Amplitude in P(lant Sociology Based on Similarity of Species Content", Det Kongelige Danske Videnskabernes Selskab Biologoske Skrifter, vol. V., No. 4, 1948. (41 pages).
Torgerson, W., "Multidimensional Scaling: I. Theory and Method", Psychometrika, vol. 17, No. 4, Dec. 1992, pp. 401-419.
Van Setten, M., "Supporting People in Finding Information", Telematica Institut Fundamental Research Series, The Netherlands 2005. (260 pages).

* cited by examiner

Low-level parameter values for the documents

| Title of the document | Tempo | Energy | Zero-crossing rate | Brightness | Envelope | Bandwidth |
|---|---|---|---|---|---|---|
| Once upon a time | 51143 1.86147 | 1.18507 E+8 | 34925 | 3,57 −759,773 | 3464.9 4637.7 | 5666 57743.9 |
| Terminator | 22546 2.2132 | 2.45232 E+8 | 15421 | 4,23 −852,2 | 5226 4512.2 | 6233 51283.9 |
| Avatar | 44592 1.5623 | 1.1206 E+8 | 34509 | 5,02 −785,773 | 4699.2 5022.8 | 5526 32593.9 |
| Midnight Express | 34512 1.9445 | 1.84215 E+8 | 39444 | 4,57 −612.1 | 5690 4220.8 | 51254 55263.8 |
| Home | 50122 1.9045 | 1.2451 E+8 | 24567 | 4,56 −899.01 | 5692.1 5523.2 | 5256 57998.7 |
| The Partisan Leonard Cohen | 49223 2.1405 | 1.407 E+8 | 28102 | 6,23 −611.744 | 3884.9 4567.7 | 5687 51543.5 |
| Daddy Cool – Boney M | 48599 1.8956 | 1.1054 E+8 | 31022 | 6,01 −562.02 | 3169.2 4199.7 | 5126 57225.0 |
| Just my Imagination | 21559 1.9985 | 1.72945 E+8 | 37405 | 4,58 −566.23 | 3464.9 3652.7 | 5654 57743.6 |
| You've got a friend | 44560 1.8944 | 1.4098 E+8 | 39552 | 3,95 −523.012 | 5264 4415.7 | 5989 55513.8 |
| Brown Sugar – Rolling stones | 53555 2.2600 | 1.244 8 | 38626 | 4,98 −528.888 | 3844.5 3926.7 | 5777 52153.2 |

Fig. 2

METHOD FOR NAVIGATING IDENTIFIERS PLACED IN AREAS AND RECEIVER IMPLEMENTING THE METHOD

This application claims the benefit, under 35 U.S.C. §365 of International Application PCT/EP2011/050285, filed Jan. 11, 2011, which was published in accordance with PCT Article 21(2) on Jul. 14, 2011 in French and which claims the benefit of French patent application No. 1050151, filed Jan. 11, 2010.

The invention relates to a method for navigating amongst documents displayed on a display screen and a receiver equipped with a user interface using the method.

At the present time, many users have a device at home for reproducing audio or audiovisual documents. These documents are generally stored in a digital form, either in the device itself, for example in the hard disk, or within a domestic local network, or again in a database accessible via a public network such as the Internet. These documents can for example be videos, audio documents or else fixed images. In order to access these documents, the user generally disposes of an interface allowing the set of these documents to be displayed and the navigation within this set. The documents appear on the screen of a display device in the form of an identifier, which allows the user to browse through all of the accessible documents. The identifiers generally appear in lists incorporated into menus. This identifier may be the title, or an image, or any other displayable element representative of the document. In the case of an image used as an identifier of a document, this image may be an extract from a video document, a photo of the performer of an audio document, a part of a photographic document, etc. The identifier known as a "graphic identifier" is generally associated with the document by the producer of the said document; it may also be defined and associated by the user himself.

When access to a large number of documents is desired, the display of the list of identifiers of these documents does not allow the document that it is desired to display to be easily found. The user interface then needs to be able to take into account additional data associated with each document, so as to allow a classification of these documents according to certain criteria. These classification criteria are for example the theme of the document, its type, its duration, its date of generation, the identity of the producer and of the main actors, the words in its summary, the rating of this document, etc. These elements, referred to as "high-level", which may also be called metadata, are generally defined by the producer. In the absence of these elements, another way of classifying the documents may be based on the direct analysis of the signals of their sound component. Analysis techniques exist for the sound signal of an audio content which allow the parameter values referred to as "low-level parameters" for this content to be calculated. These parameters are for example: the tempo, the energy, the brightness, the envelope, etc. They are determined by analysis of the signal either in its digital form, or in its analogue form. A technique for indexation of audio content is notably described in the article "Speech and Language Technologies for audio indexing and retrieval" published in August 2000 in the IEEE Review, pages 1338 to 1353 of Volume 88. The article explains how, by analysis of an audio signal, various sound contents can be classified. Other articles describe means for calculating low-level parameters and possible uses; here are other articles included by reference to the present patent application:

B. Feiten and S. Gunzel, Automatic indexing of a Sound Database using self-organizing neural networks, Computer Music Journal, 18 (3°, 1994)

Eric Scheirer, Music Listening systems, PhD thesis, MIT Media Laboratory, April 2000.

Once the low-level parameters have been determined for each audio document of a collection to be classified, these documents can be classified into various groups according to these parameters. Thus, classical music contents can constitute a group, as can jazz pieces form another group, etc.

Another known way of presenting documents on a display device consists in using all or part of the available classification data, whether this be metadata or low-level parameters, in order to calculate identifier localization coordinates for these documents on the screen of this display, in other words in a two-dimensional space. The documents are for example represented on a display by dots, which allow a large number of them to be displayed. By selecting a dot on the display, the navigation interface for this display makes for example the title of the document associated with this dot appear, and the user can then introduce a command in order to launch the reproduction and/or the display of this document in full screen mode. This type of navigation interface can also make the similarities between the various documents whose identifier is displayed appear, for example by the fact that the distance between the dots which identify them on the screen is small. Thus, as in the case of a starry sky, nebulae of dots indicating the presence of a group of documents having significant similarities can be seen on the screen of the display device. These groups of documents can be identified by a graphical element specific to groups, which is supplied by the navigation interface, or by the title of a document of the group, typically that whose identifier is placed closest to the equibarycentre of the positions of the identifiers of the group. The navigation interface can also display the outer contours of the groups together with the identifiers.

However, even with this type of navigation interface, if the number of documents is very large, the user can have difficulties in distinguishing a dot identifying a document in a region of the screen where the density of dots is too high. One solution consists in enlarging this region to be explored by zooming in. Only a part of the identifiers of the documents is then displayed. The user then loses the overall view of the available documents, and the menu displayed cannot show the position of an identifier within the whole set of available documents.

It is therefore of interest to establish a graphical interface which has groups of documents and navigation commands that allow them to be explored efficiently.

The Patent application FR01/03576 describes a method for navigation within a set of multimedia documents. Numerical values are assigned to the attributes of these documents, and coordinates are deduced from these, such that the distances between the identifiers displayed relating to the documents are shorter the greater the similarity between their attributes. The regions of higher density are determined, together with the centre of these regions. Groups are formed around these central points, in such a manner that these groups contain a predetermined maximum number of documents. These groups, composed of the group of the current document together with a certain number of peripheral groups whose size is limited, are displayed such that the peripheral groups displayed are those which have the most similarities with the group of the current document. The coordinates are only taken into account for the formation of these groups, the display coordinates of identifiers displayed not being those initially deduced from the attributes of the documents.

The Patent application EP1669897A2 describes a method for processing of information, consisting in mapping elements to nodes of a network of nodes, in such a manner that similar elements are positioned in the same way with respect to a given node. Representation vectors are shown for each identifier of a document. Coordinates x, y are subsequently generated from these representation vectors, and the identifiers of these documents are displayed as a function of these coordinates.

One subject of the invention is a method for navigating over documents represented by identifiers displayed on a navigation menu, each document being associated with a plurality of numerical values characterizing it according to a plurality of criteria, comprising a first step for displaying identifiers at positions dependent on a part of the parameter values associated with each document.

The method furthermore comprises a step for determining a given number of regions containing documents, the sums of the values associated with all the documents of a region and corresponding to a certain number of criteria are virtually equal for each region thus determined, a step for displaying the outer contour of each region, and a step for introduction of a command for selection of a region triggering a second display step only displaying the identifiers of the region selected within the displayed navigation menu.

In this way, the user sees a subdivision of all of the documents into a plurality of regions, the positions of the document identifiers and of the outer contour of the regions assist the user in the choice of the region to be selected for continuing in the navigation.

According to a first variant, each region thus determined contains the same number, to the nearest unit, of identifiers, and hence of documents. In this way, whichever is the first region selected from the first navigation menu, the same number of navigation levels is found.

According to a second variant, the total sum of the values associated with all the documents and corresponding to a certain number of criteria is calculated, and the regions are determined whose sum of the values associated with all the documents of these regions are virtually equal to the total sum divided by the number of regions. In this way, each region thus determined possesses the same overall value according to the criteria which have allowed the subdivision. If this criterion is the satisfaction rating, each region displayed contains a set of documents which have the same satisfaction rating.

According to a third variant, the subdivision into regions involves a user profile composed of a list of preferred attributes for the user, and for each document, a value is generated evaluating the correlation between the attributes of the said document and the attributes of the profile of the user. The sums of the values thus calculated for each document present within a region are virtually equal for each of the regions thus determined. In this way, each region thus determined offers overall the same interest for the user.

Another subject of the invention is an electronic device comprising a means for displaying a navigation menu comprising document identifiers, each document being associated with a plurality of numerical values characterizing it according to a plurality of criteria, a means for introduction of an action by a user, the said means allowing a part of the navigation menu to be selected, The device furthermore comprises a means for determination of a given number of regions containing document identifiers, the sums of the values associated with all the documents whose identifiers are situated within a region and corresponding to a certain number of criteria are virtually equal for each region, the display means displaying the outer contour of each region thus determined, the means for introduction of an action by a user receiving a command for selection of a region triggering the display of a navigation menu which only contains the identifiers of the selected region.

A further subject of the invention is a method for navigating within a set of documents identified by identifiers displayed in a navigation menu on a display device, each document being associated with a plurality of numerical values characterizing it according to a plurality of criteria, the method comprising the following steps:

Determination of the position on the display device of the display of the identifier for each document based on a part of the numerical values associated with this document, Display of the identifier for each document on the display device according to this determined position, Determination of regions of the display grouping each of the document identifiers, Introduction of a command for selection of a region triggering a step for displaying a navigation menu which only contains the identifiers of this region, the determination of the regions being carried out in such a manner that, within each region, the number of documents whose identifiers are positioned within this region are the same to the nearest unit, the method also comprising a step for displaying the outer contour of each region thus determined.

Thanks to the invention, each region thus determined contains the same number, to the nearest unit, of identifiers, and hence of documents. The user immediately identifies the region of documents which are of interest to him since the position of the documents depends on criteria known by the user, and can subsequently navigate within the same region by visually selecting the region which is of most interest to him. Distributing the documents equitably between the regions furthermore avoids losing time in searching for documents within a region with a low population of documents. Although several distributions are possible, the distribution adopted, which is equitable between the regions to the nearest unit, is that which is optimal from this point of view: its choice is therefore deliberate and not at all arbitrary.

According to one variant, the numerical values taken into account for generating the position of the identifiers within the navigation menu are different from those used by the step for determining the regions.

According to another variant, the navigation method comprises a plurality of successive steps for introduction of a command for selection of a region.

Thus, by the successive introduction of several selection commands, the user can find the document of interest to him from amongst a mass of initial documents displayed. This way of navigating is very intuitive, since it is the position of the document which informs the user of the relevance of the document. Since it is intuitive, anyone can learn this manner of navigating with very little effort, notably people who have little or no interest in computer technology. Moreover, not only does the user very quickly get used to it, but in addition, can navigate extremely adeptly within a mass of initial documents displayed in a very short space of time. If, for example, the choice is made to divide by ten the number of documents at each introduction of a selection command, starting from one hundred documents, one relevant document is arrived at after having introduced only two successive selection commands, the user never having had to choose from amongst more than ten regions displayed.

According to another variant, when each region of the navigation menu displayed contains at the most one document identifier, then the introduction of a command for selection of a region leads to the reproduction of the document identified by the identifier present in the said region.

Thus, having arrived at the final document, the user has the possibility of reproducing it by the simple introduction of a selection command. The region, which occupies a surface area on the display much larger than that of the identifier, is easier to select, and hence also quicker to be selected.

Advantageously, the navigation method according to the invention also comprises the following steps:

Generation of a profile of the user consisting in creating a list of preferred attributes for the user, Determination of a plurality of attributes associated with each document, including the part of the numerical values characterizing this document, Within each of the regions, determination of the document having the strongest correlation between the attributes associated with this document and the attributes of the user profile, Identification on the display device of each region by the display of an identifier of the document having the strongest correlation.

In this way, each region becomes more easily pinpointed thanks to the display of this additional identifier. Moreover, this additional identifier, representing a region, is that of the document considered to be of greatest interest for the user. Thus, the user is immediately able to see if this region is of particular interest for himself. A further subject of the invention is an electronic device comprising a means for displaying a navigation menu comprising document identifiers, each document being associated with a plurality of numerical values characterizing it according to a plurality of criteria, a means for introduction of an action by a user receiving a command for selection of a region triggering the display of a navigation menu which only contains the identifiers of the selected region, this means allowing a part of the navigation menu to be selected, a means for determination of regions of the display grouping each of the document identifiers, the means for determination of the regions determining these regions in such a manner that, in each region, the number of documents whose identifiers are positioned within this region is the same to the nearest unit, the display means displaying the outer contour of each region thus determined.

Figure 3:
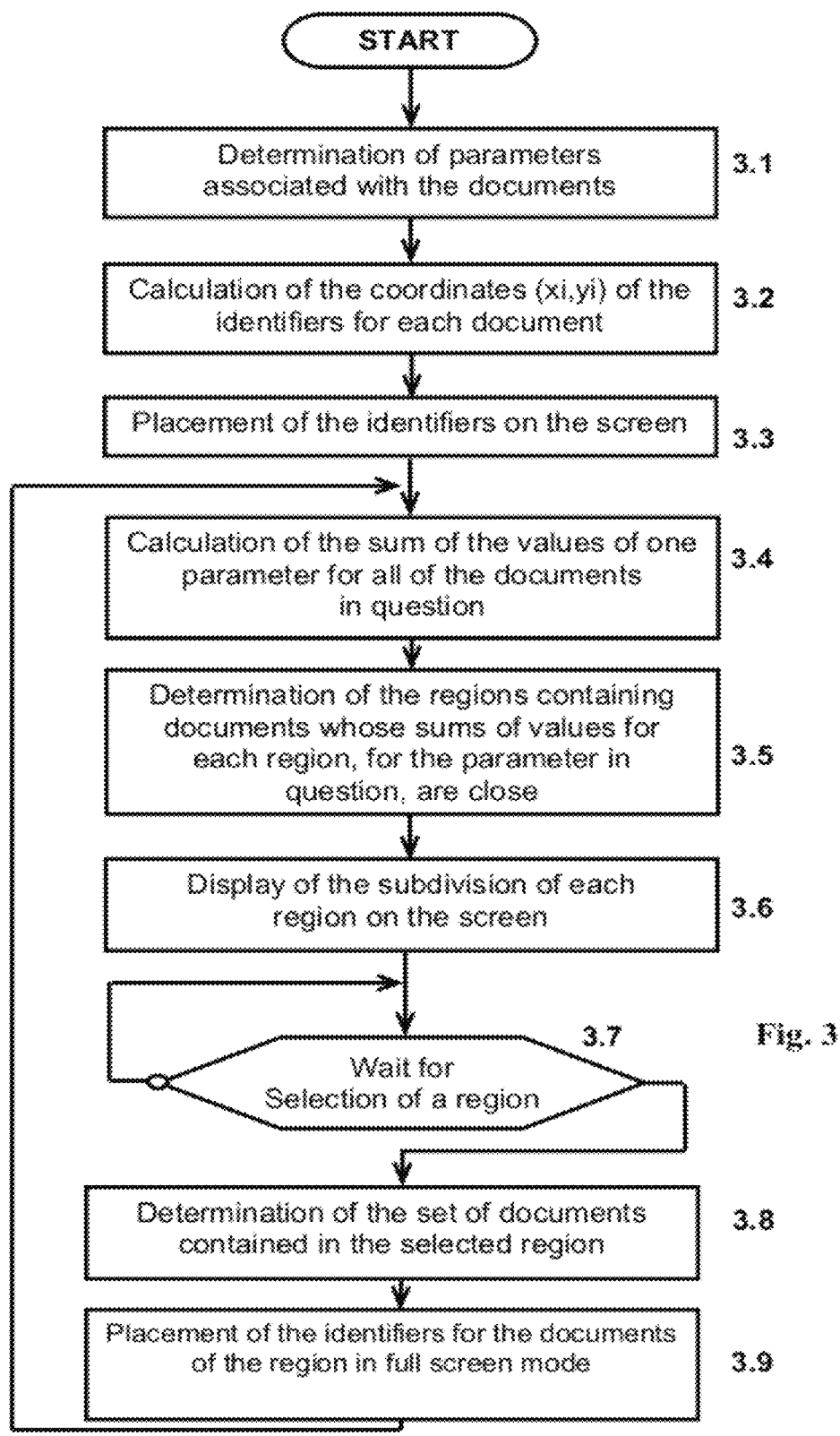
Figure 4:
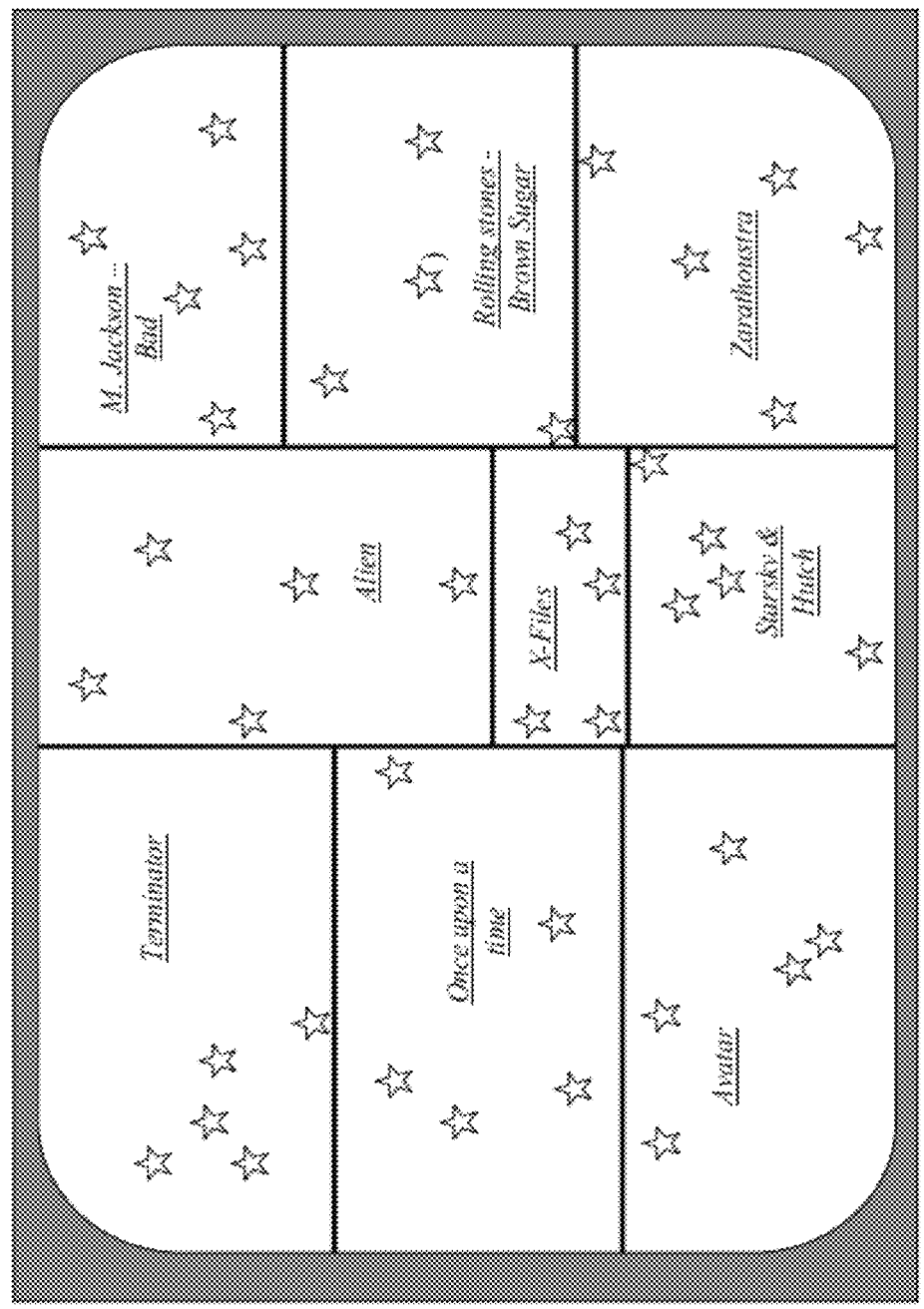
Figure 5:
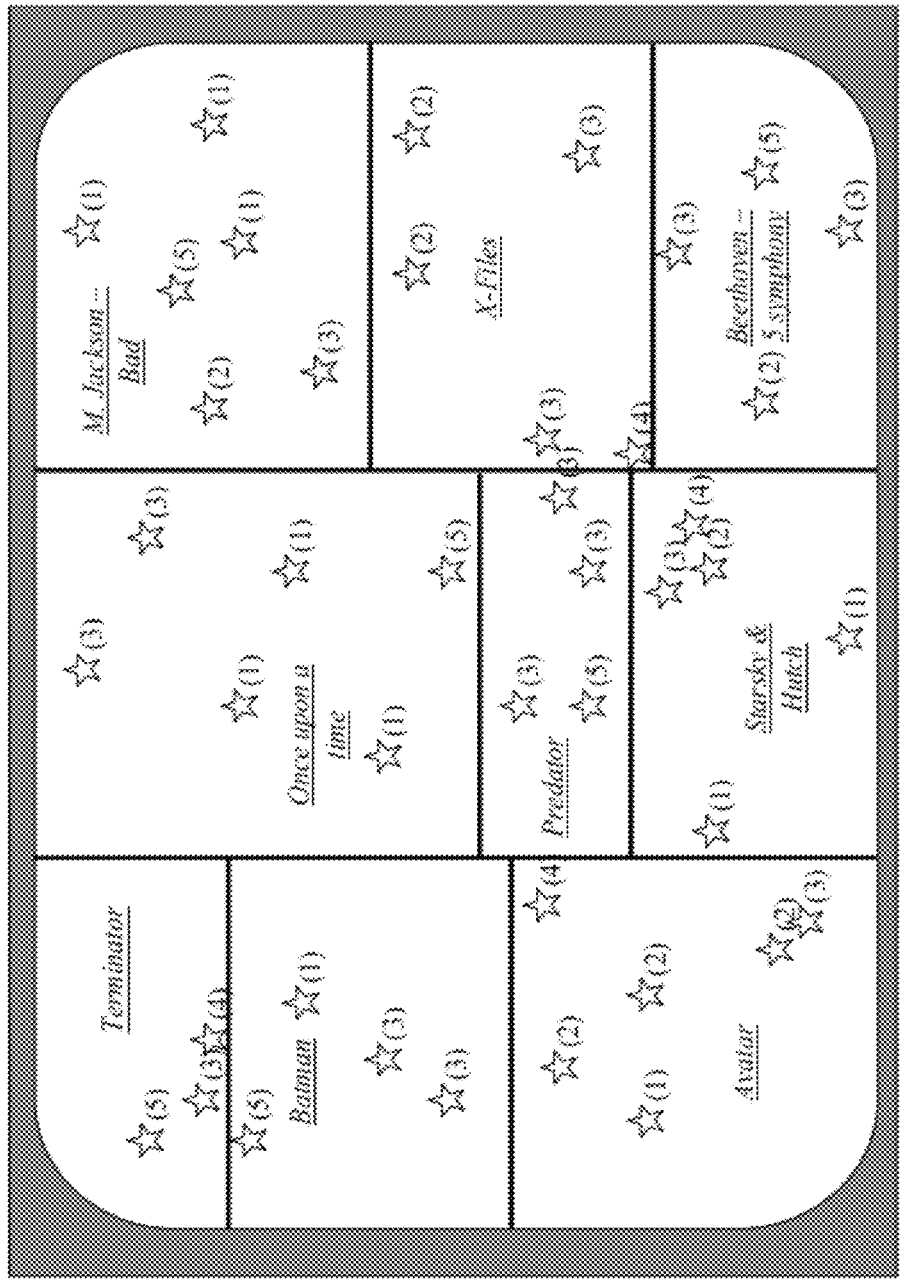
Figure 6:
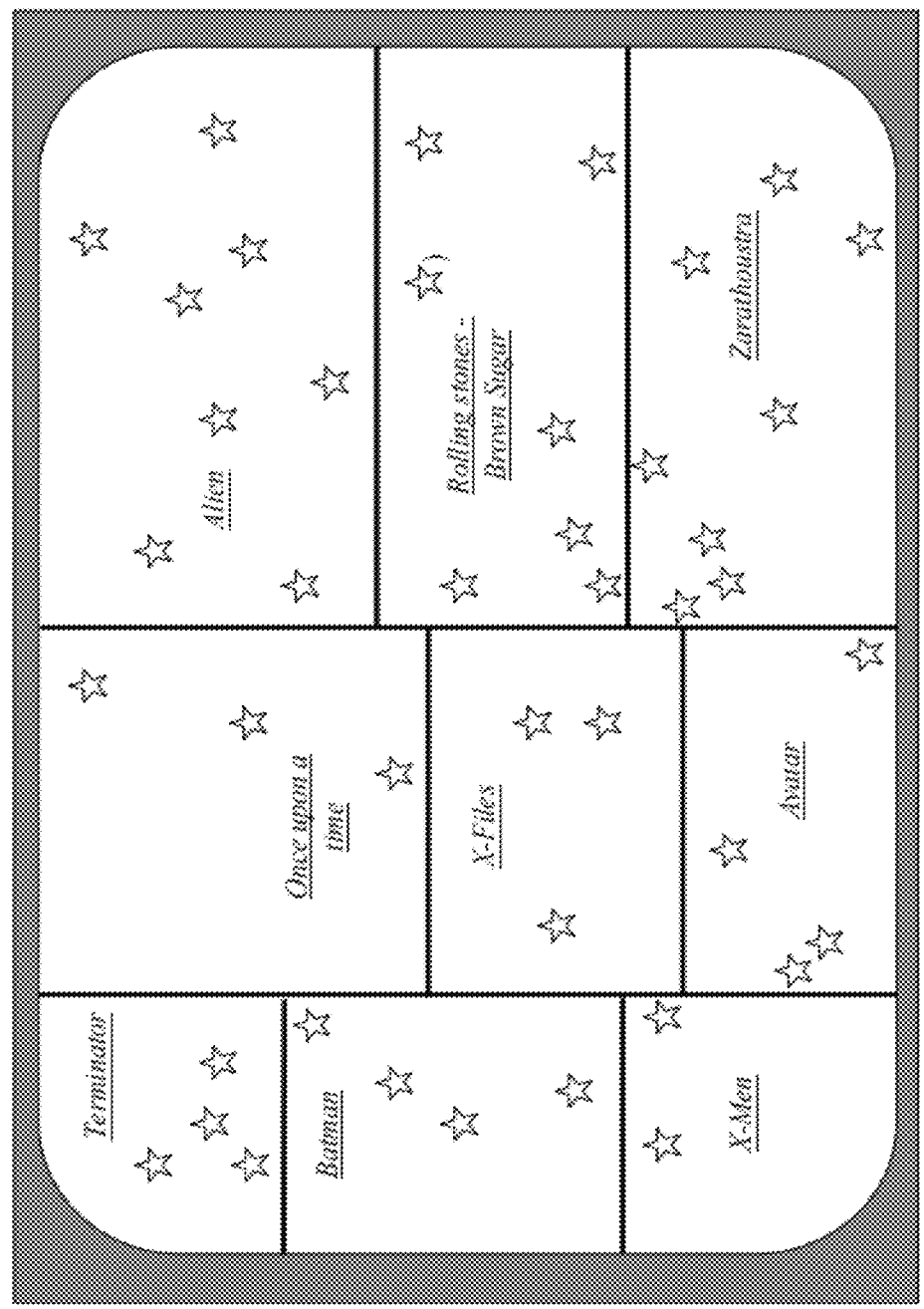

Others features and advantages of the invention will now become apparent with more details in the framework of the description that follows of exemplary embodiments presented by way of illustration with reference to the appended figures, which show:

FIG. 1 is a block diagram of a multimedia receiver for the implementation of one exemplary embodiment of the invention, FIG. 2 is a table associating for each document of the collection its values of low-level parameters, FIG. 3 shows one example of a flow diagram for the main steps of the method according to one exemplary embodiment of the invention, FIG. 4 shows one example of a navigation menu according to a first variant embodiment of the invention, FIG. 5 shows one example of a navigation menu according to a second variant embodiment of the invention, FIG. 6 shows one example of a navigation menu according to a third variant embodiment of the invention which involves the profile of the user.

According to one exemplary embodiment of the invention, the structure of a receiver device, here a multimedia receiver 1, is first of all described, which is connected to a display device, here a television screen 2. This receiver device can be a computer with or without an integrated display screen, and having software for document storage and for navigation within these documents. Other receiver devices may also be envisaged and be applicable to the present invention, for example a PVR or any device capable of accessing audio or audiovisual content and disposing of means for creating and displaying menus. The multimedia receiver 1 comprises a central processing unit 3 connected to a programme memory 12, and an interface 5 for communications with a high-data-rate digital bus 6 allowing audio and/or video data to be transmitted in real time. This network allows remote servers to be accessed, the most common being the IP network. The receiver can also receive audio and/or video data from a broadcast network via a receiver antenna associated with a demodulator 4. The multimedia receiver 1 furthermore comprises a receiver for infrared signals 7 for receiving the signals from a remote control 8, a memory 9 for storing the audiovisual contents and a database, and an audio/video decoding logic 10 for the generation of the audiovisual signals sent to the television screen 2. The remote control 8 is for example of the "Gyration" type. It is equipped with gyroscopes so as to transform movement in space into a signal. By moving the remote control to the left, to the right, up or down, and also from front to back, the user moves a cursor on the screen, as would be done with a computer mouse by moving it over the mat. This type of remote control is particularly advantageous if the navigation menu is displayed in three dimensions. Whatever its type, the remote control comprises at least one function key such as "OK", whose function will be seen later. The memory 9 is advantageously a hard disk with several hundreds of megabytes, allowing several hours at least of audiovisual content to be recorded. This audiovisual content is identified by a recorded title and/or one or more thumbnail images which are stored in the database. As described hereinafter, it is these thumbnail images that will be displayed by the user interface on the television screen 2.

The receiver also comprises a circuit 11 for displaying data on the television screen 2, often called an OSD circuit, for "On Screen Display". The OSD circuit 11 is a text and graphics generator which allows menus and pictograms (for example, a number corresponding to the channel being viewed) to be displayed on the screen and which allows the navigation menus according to the present invention to be displayed, and notably one or more control bars or buttons. The OSD circuit 11 is controlled by the central processing unit 3 and a programme called navigation module is stored in the memory 12. The navigation module advantageously takes the form of an executable programme recorded in a non-volatile memory or downloaded from a network. It may also take the form of a specialized circuit of the ASIC type for example.

The digital bus 6 and/or the broadcast network transmit data to the receiver comprising multimedia contents and descriptive data or "attributes" for these contents. These data, referred to as high-level data, originate either from a broadcast network or from the digital network 6. The descriptive data comprise classification elements for the multimedia contents, generally called "attributes". The descriptive data, referred to as high-level data, are for example metadata defined according to the MPEG7 standard, and/or for example the title or an image identifying the associated document. If these data are not numerical, a codification system allows a numerical value to be assigned to each data value.

Other classification data exist, for example according to the IMDB standard (from the acronym: "Internet Movie DataBase") for theme-related data, notably for the classification of films such as illustrated in Table 1.

TABLE 1

| Action | Adventure | Animation | Biography | Comedy | Crime | Documentary |
|---|---|---|---|---|---|---|
| Drama | Family | Fantasy | Film-Noir | Game-Show | History | Horror |
| Music | Musical | Mystery | News | Reality-TV | Romance | Sci-Fi |
| Short | Sport | Talk-Show | Thriller | War | Western | |

These descriptive data are either stored in the database of the memory 9 of the receiver and updated, or stored in a database stored in a remote server and constantly accessible by the receiver 1. The navigation module subsequently extracts the information from this database and processes it in order to construct the navigation menus displayed on the screen.

According to one exemplary embodiment, the descriptive data or "attributes" of the documents used for the placement of the identifiers within the navigation menu displayed on the television screen 2 are extracted from the audio component of the documents. As was indicated in the introduction, there exist many techniques for analyzing the audio component in order to generate low-level descriptive data. The descriptive data or "attributes" associated with the documents are written into tables of numerical descriptors. The number of elements in a descriptor is of the order of a few tens. One example of a table of low-level audio descriptors is illustrated in FIG. 2. The first column of the table shows the title of the audio content which serves as an identifier. The following columns show the values of low-level descriptive data associated with the document, such as the mean sound intensity, the tempo, the energy, the rate of zero-crossing, the brightness, the envelope, the bandwidth, the loudness, the cepstral coefficients, etc.

These low-level descriptive data can be generated by the multimedia receiver 1. According to one variant, the descriptive data are transmitted in digital form with the document. In this case, the associate low-level descriptive data constitute a field attached to the transmitted document. This solution is particularly advantageous because the calculation of the descriptive data is carried out by the producer or the supplier of content and not by the user; accordingly, it is carried out only once.

Whether they be downloaded or calculated locally, the low-level descriptive data are used for determining the position of the identifiers of the associated documents. One way of proceeding consists in positioning points Pi identifying each document in a multidimensional space comprising as many dimensions as the number of low-level parameters possessed by the documents.

In order to determine the position of the identifiers on the television screen 2, a projection of the descriptive data onto a two-dimensional space can then be used. The coordinates (xi, yi) of each point are obtained by projection of the point Pi onto a space with 2 dimensions. The projection is determined by principal component analysis or PCA. PCA is notably described in the document by Saporta 1990, entitled "Probabilities, Data analysis and statistics", Edition Technip. This well-known data analysis algorithm tries to find a sub-system of axes linearly linked to the original which best "spreads out" the samples, these axes tending to make the original correlated axes coincide. The low-level descriptive data being assumed to have a noticeable coherence (the nearby sounds can be heard if and only if the values of the low-level descriptors are close), and the projection onto the two-dimensional space being continuous, the documents associated with points that are close to one another in this two-dimensional space are similar at least in the sound dimension. It should be noted that, in the case of the use of a display allowing 3D images to be displayed, the same technique can be applied to a space with 3 dimensions.

In what has been previously described, low-level descriptive data generated by the multimedia receiver 1 for the documents are used for the placement of the identifiers of these documents, which suits audio documents very well. If the navigation module has audiovisual documents, the analysis of the sounds is of limited interest. It is preferable, in this case, to use high-level descriptive data which are received by the multimedia receiver 1 and associated with the documents. If the navigation module has audio and audiovisual documents, common criteria need to be chosen for the placement of the identifiers for these two types of documents on the television screen 2. If the descriptive data or attributes of the documents are not numerical, a codification system allows a numerical value to be assigned to them.

The various steps of the navigation method will now be detailed with the flow diagram in FIG. 3 and the screen shots in FIGS. 4, 5 and 6.

At the step 3.1, the navigation module groups the descriptive data already available associated with the documents and determines the low-level descriptive data, notably those coming from the analysis of the audio content of the document. Then, the navigation module uses at least a part of these descriptive data for calculating coordinates (xi,yi) of the identifiers associated with each document (step 3.2). At the step 3.3, all of the identifiers for each document are placed on the navigation menu on the television screen 2 according to the calculated coordinates. These identifiers are graphical symbols such as dots, crosses, stars, etc. When the identifiers for two documents are close to one another on the television screen 2, this means that similarities exist between these documents, at least in the sound dimension. The user moves an index by means of the mouse or the remote control and positions it on the identifier. A window containing the title of the document then appears. If this document is the desired one, the user launches its reproduction by hitting the button "OK".

When the number of identifiers is large, the identifiers appear in compact clusters. Using a graphical index that is moved with a mouse or by the remote control, it is difficult to select an identifier individually. According to the invention, the navigation module defines regions that the user can select then triggering an enlargement of the region on at least a part of the menu displayed. The present invention describes an original way of dividing up the menu presenting the identifiers within a given number of regions.

First of all, at the step 3.4, the navigation module takes into account, for the whole set of documents, all the values of one of the descriptive data values and adds them up to calculate the sum of the values for this set. According to one important aspect of the invention, the number of regions in the navigation menus is constant. The examples illustrated in the figures show a subdivision into nine regions. The navigation module determines graphically nine regions containing sub-sets of documents whose sum of the values of one of the descriptive data values is equal to a ninth of the sum of the values of the set, to the nearest few units. Advantageously, each region thus determined has approximately the same weight.

Several variants exist for determining graphically the nine sub-regions at the step 3.6. According to a first particularly simple variant, the descriptive data value taken into account is the number of documents per sub-region. The navigation module determines nine sub-regions containing, to the nearest unit, the same number of identifiers. FIG. 4 illustrates this variant. According to the example illustrated, 43 identifiers are displayed in the form of stars. First of all, the module divides the menu up into three regions containing 14 or 15 identifiers. The module then defines the position of the two vertical lines dividing the menu into three parts. Then, within each part, the module again divides by three using horizontal lines. After this operation, the menu displays nine regions having 4 or 5 elements. This manner of dividing up the menu is particularly simple to implement. In addition, it allows the documents to be equitably distributed within the regions such that if data tree structure levels are applied to the navigation, the same number of levels exists whichever region is selected within the starting menu.

According to a second variant embodiment, the subdivision is applied by taking into account the value of a descriptive metadata value, such as the satisfaction rating of the document. The satisfaction rating is a piece of information generated by the producer which represents the interest of a large group of people with regard to this document. Typically, this rating is generated based on information such as: the number of people having seen the film, the number of cinemas reproducing the document, the turnover, the evaluation made by the literary criteria, etc. In the example illustrated in FIG. 5, the satisfaction rating of each document has been indicated by a number varying from 1 to 5 placed next to the identifier for the associated document; normally, this value does not appear the screen. The subdivision is applied in the same manner as for the first variant. The navigation module calculates the sum of all the satisfaction ratings; in the present case, the sum is equal to 117. Then, the module divides the space into three regions containing the identifiers of three groups of documents, the sum of the satisfaction ratings of each document of each group being to the nearest few units equal to 117/3=39. Then, each group is itself divided into three, the sum of the satisfaction ratings of each document of each sub-group being, to the nearest few units, equal to 39/3=13. The subdivision is different from that of the first variant. This is because, within a small region, a small number of documents very well known and appreciated by everyone can be found, and next to it a large region containing many more documents but with little appreciation by the public. This subdivision allows each region selected within the starting menu to present the same overall interest.

According to a third variant embodiment, the subdivision is applied by taking into account a profile of the user and by correlating the descriptive metadata for each document with the said profile. This variant is illustrated in FIG. 6. A user profile is a list of attributes extracted from the same classification criteria characterizing the documents. A profile can be introduced manually; for example, for the criterion "theme" the user is presented with the list: "romantic, action, historical, documentary, erotic, sport" and he chooses the one most attractive to him. It is also possible to create the data for a profile automatically by analyzing the behaviour of the user based on his choice of programmes. According to this variant, the navigation module extracts the descriptive metadata or "attribute" for each document and compares it, for the same classification criterion, with the attributes of the profile. Each time that a descriptive metadata value or "attribute" of a document corresponds to an attribute of the profile of the user, a counter is incremented, and a value expressing the interest of the user in this document is thus obtained. Once all of the documents have been analyzed and once the interest of the user has been determined for each document, in the same manner as before, the navigation module adds up the values of the interests of the user. Then, it firstly performs a subdivision into three regions containing the identifiers of three groups of documents, the sum of the values expressing the interest of the user for each document of each group being equal, to the nearest few units. Then, each group is itself divided into three, the sum of the values expressing the interest of the user for each document of each sub-group being equal, to the nearest few units. This third variant produces a third subdivision different from the first two. This third subdivision allows each region selected within the starting menu to offer the same overall interest for the user.

Whichever variant is used for the subdivision into regions, the navigation module highlights this subdivision on the screen by graphically bounding a given number of contiguous regions. In the examples illustrated in FIGS. 4, 5 and 6, the contiguous regions have a rectangular shape, but other shapes are also possible: triangular, trapezoidal, pentagonal, etc. Similarly, if the display is produced in 3D, the shapes of the volumes into which the initial menu is subdivided are very varied. The examples illustrated show a subdivision into nine regions, but it is clear that any number of regions is possible. Whichever variant is used for the subdivision into regions, the parameter or parameters used for performing the subdivision is/are not used for the placement of the identifiers on the screen. For example, if the subdivision is carried out by the parental index associated with each document, since some films are more violent than others, then this criterion is not used for the placement of the identifiers.

Once the regions are displayed on the television screen 2, the user can select them by positioning an index inside the region and hitting the button "OK" (step 3.7). At the step 3.8, the navigation module thus defines a new working set containing all the documents located within the selected region. The navigation module then displays in full screen mode the identifiers of the documents forming the new working set (step 3.9). Then, the module loops back to the step 3.4 in order to determine the same number of regions by taking into account the documents forming the new working set. Thus, the user can navigate within data tree structure levels where the working set comprises fewer and fewer documents. Depending on the menu subdivision criterion and on his knowledge of the way to position the identifiers on the screen, the user can direct his search by selecting a region and thus selecting a new set having fewer documents.

During the navigation within the data tree structure levels, the user selects a set containing a more and more limited number of documents. At a certain level, the menu displayed will only contain nine documents which will themselves be the representives of each of the nine selectable regions. At this stage, the selection of a region which only contains one document no longer triggers a new navigation menu, but the selection of this document and hence its reproduction. It is therefore possible to launch the reproduction of a document by selecting the region. This possibility is particularly advantageous when no cursor or mouse is available for moving it, the cursor being able to select a document identifier and launch its reproduction from the navigation menu. Thus, the user can have a decimal keyboard where each of the nine keys "1" to "9" is associated with each of the nine regions displayed and can launch the reproduction of a document by using only these nine keys. In this way, it is possible to display only region representatives, to navigate up to the last level of navigation and, having arrived at this level, to trigger the reproduction of the documents.

The user also disposes of a return command for returning to the preceding menu and hence to the preceding subdivision of regions and to the preceding set of documents.

According to one improvement, the navigation method comprises a step for introduction of a command for selection of the criterion or criteria which is/are used for the subdivision into regions. This command is introduced into a configuration menu where the user is offered the list of criteria that may be used for the subdivision into regions, and the user can thus choose one or other of the region subdivision variants which have been previously described, such as for example:

Equal number of documents per region, (first variant embodiment)
  Subdivision according to the satisfaction rating,
  Subdivision according to the parental index,
  Subdivision according to the duration of reproduction of the document,
  Subdivision according to the preferences of the user, (third variant embodiment)
    etc.

The user selects one or more of these subdivision criteria, and the navigation module takes into account the choice of the user during the subdivision.

According to one improvement, the navigation method also disposes of an original means for identifying each of the regions displayed. Taking again the examples in FIGS. 4, 5 and 6, this means consists in determining a document present in each of the nine regions displayed, this document becoming the representive of the region. According to this improvement, the choice of the document is made by correlating the descriptive metadata or "attribute" for each document present in a region with the attributes composing the profile of the user. The navigation module extracts the descriptive metadata for each document from the region and compares it, for the same classification criterion, with the attributes of the profile of the user. The document from the region whose descriptive metadata or "attributes" exhibit the strongest correlation with the attributes of the profile of the user (for example: strong correlation between the theme of the documents and the preferred themes of the user and strong correlation between the durations of reproduction for the documents and the preferred durations of reproduction of the user, corresponding to the duration for the documents generally selected by the user), is considered as that representing the region. Its title is then displayed in the region. In this way, the user sees additional information associated with each region. It goes without saying that, depending on the subdivision applied by one or other of the three variants, the documents present within each region vary and hence the representive of the region can change. It is for this reason that the document titles appearing underlined in each region are not the same in FIGS. 4, 5 and 6.

Although the present invention has been described with reference to the particular embodiments illustrated, it is not in any way limited by these embodiments, but only by the appended claims. It will be noted that changes or modifications could be applied by those skilled in the art to the embodiments previously described, without however straying from the framework of the present invention.

The invention claimed is:

1. A method for navigating within a set of documents identified, the method comprising:
  calculating, in a multi-dimensional space, coordinates of identifiers associated with identified documents, from numerical values of low-level descriptive data determined from an audio component of the identified documents, said multi-dimensional space comprising as many dimensions as the number of low-level descriptive data of the identified documents;
  positioning on a display device the identifier of each identified document based on its calculated coordinates;
  dividing a navigation menu displayed on the display device into a set number of regions grouping the document identifiers;
  displaying of an outer contour of each region; and
  receiving a command for selection of a region among the set number of regions, said command for selection triggering the displaying of a modified navigation menu having the same set number of regions and which only contains identifiers of the selected region.

2. The navigation method according to claim 1, wherein the numerical values taken into account for determining the position of the identifiers within the navigation menu displayed on the display device are different from those used for dividing into regions.

3. The navigation method according to claim 1, wherein it comprises a plurality of successive steps for introduction of a command for selection of a region.

4. The navigation method according to claim 1, wherein, when each region of the modified navigation menu displayed contains at the most one document identifier, an introduction of a command for selection of a region leads to reproduction of the document identified by the identifier present in the region.

5. The navigation method according to claim 1, further comprising:
  generating a profile of a user consisting in creating a list of preferred attributes for the user;
  determining a plurality of attributes associated with each document, including the said part of the numerical values characterizing this document;
  with each of the regions, determining the document having a strongest correlation between the attributes associated with this document and the attributes of the user profile; and
  identifying on the display device each region by the display of an identifier for the said document having the strongest correlation.

6. An electronic device comprising:
  a display screen configured to display a navigation menu comprising document identifiers, each document being associated with a plurality of numerical values of descriptive data characterizing it,
  a receiver having a central processing unit configured to:
    calculate, in a multi-dimensional space, coordinates of identifiers associated with identified documents, from numerical values of low-level descriptive data determined from an audio component of the identified documents, said multi-dimensional space comprising as many dimensions as the number of low-level descriptive data of the identified documents;

divide the navigation menu into a set number of regions grouping document identifiers, the display screen being able to display an outer contour of each determined region; and position, on the screen, the identifier of each identified document based on its calculated coordinates;

an interface configured to receive a command for selection of a region among the set number of regions, said command for selection triggering the display of a modified navigation menu having the same set number of regions and which only contains identifiers of the selected region.

7. The electronic device of claim 6, wherein the numerical values taken into account for determining the position of the identifiers within the navigation menu are different than those used for dividing into regions.

8. The electronic device of claim 6, wherein when each region of the modified navigation menu displayed contains, at most, one document identifier, an introduction of a command for selection of a region leads to reproduction of the document identified by the identifier present in the region.

9. The navigation method of claim 1, wherein said set number of regions comprises nine regions.

10. The electronic device of claim 6, wherein said set number of regions comprises nine regions.

11. The navigation method of claim 1, further comprising determining said set number of regions using a number of the identified documents per region.

12. The electronic device of claim 6, wherein said set number of regions is determined using a number of the identified documents per region.

13. The navigation method of claim 1, further comprising determining the set number of regions by taking into account descriptive metadata values.

14. The electronic device of claim 6, wherein said set number of regions is determined by taking into account descriptive metadata values.

15. The navigation method of claim 13, further comprising determining the set number of regions by taking into account a profile of a user and correlating the descriptive metadata for each document with said profile.

16. The electronic device of claim 14, wherein said set number of regions is determined by taking into account a profile of a user and correlating the descriptive metadata for each document with said profile.

* * * * *